No. 628,056. Patented July 4, 1899.
J. F. WILBUR.
BACK PEDALING BRAKE.
(Application filed Mar. 8, 1899.)

(No Model.)

WITNESSES:

INVENTOR
James F. Wilbur
BY
Eugene Diven
ATTORNEY

UNITED STATES PATENT OFFICE.

JAMES FRANKLIN WILBUR, OF MARATHON, NEW YORK.

BACK-PEDALING BRAKE.

SPECIFICATION forming part of Letters Patent No. 628,056, dated July 4, 1899.

Application filed March 8, 1899. Serial No. 708,224. (No model.)

*To all whom it may concern:*

Be it known that I, JAMES FRANKLIN WILBUR, a citizen of the United States, residing at Marathon, in the county of Cortland and State of New York, have invented a new and Improved Bicycle Brake and Coaster, of which the following is a specification.

My invention relates to improvements in a combined brake and coaster for bicycles, whereby in coasting the feet of the rider may be retained upon the pedals and a backward turn upon the pedals will exert a retarding pressure upon the driving mechanism; and the object of my improvements is to apply these features to the crank-shaft and driving sprocket-wheel.

I attain the object of my improvements by the mechanism illustrated in the accompanying drawings, in which—

Figure 1:
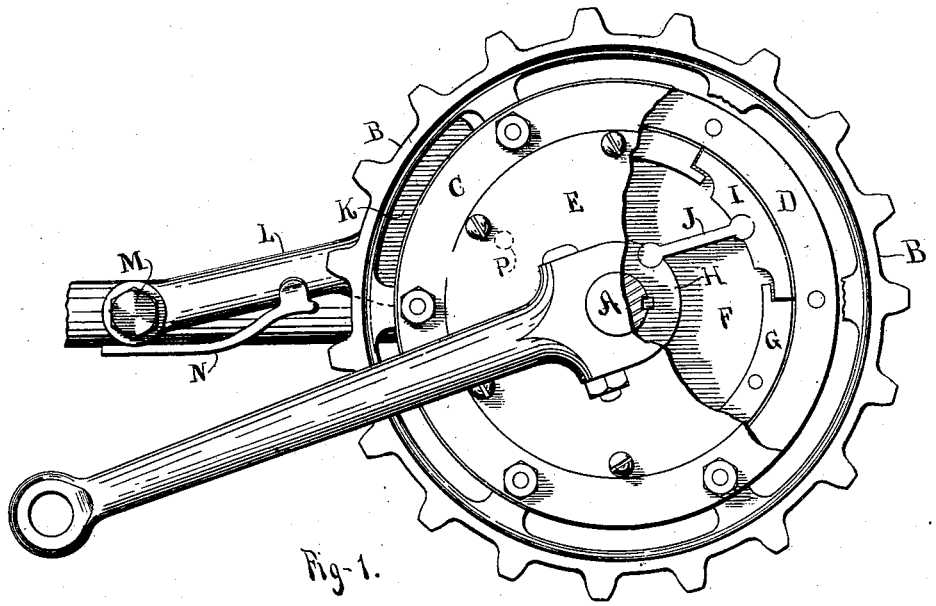
Figure 2:
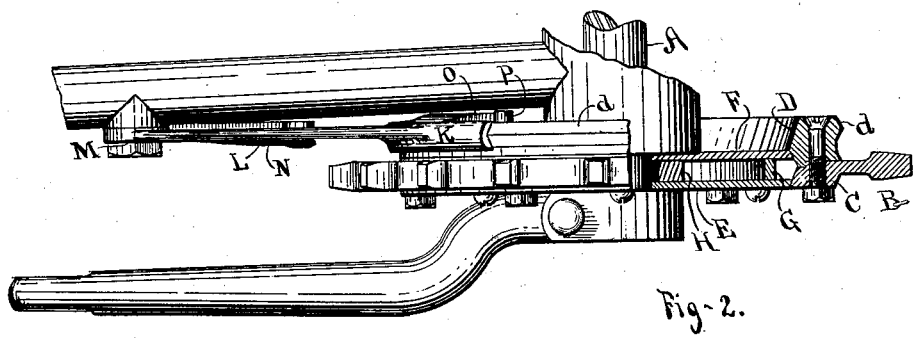
Figure 3:
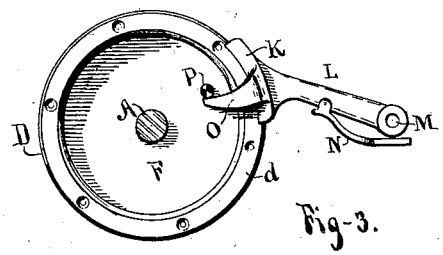

Figure 1 represents a side elevation of a driving-sprocket embodying my improvements, parts of the device being shown in section; Fig. 2, a plan view of the same, also partly in section; and Fig. 3, an elevation of parts of the device looking from the opposite side of Fig. 1.

Similar letters refer to similar parts throughout the several views.

A represents the crank-shaft, and B the driving-sprocket. This sprocket is independent of the crank-shaft and free to turn relatively thereto. To attain this freedom of movement between the sprocket-wheel and crank-shaft, I construct the parts as follows: Inside of the rim of the sprocket-wheel B is a ring C, which may be stamped out integrally with the sprocket-wheel, and bolted to this ring C is a second ring D, the two rings forming on their inner peripheries a V-shaped channel, in which runs a hollow disk formed by the two face-plates E and F, fastened to the ring G. This hollow disk is also free to turn on the crank-shaft A, and its outer periphery is formed with a V shape to run in the V-groove formed by the rings C and D. Inside of the hollow disk and fastened rigidly to the crank-shaft is a disk H, the hollow disk being held from lateral movement by this disk H. The ring G has a portion cut away, and within this cut-away portion is located a clutch-block I, connected to the disk H by the link J.

The device thus far described constitutes the coaster mechanism and operates as follows: When the pedals are driven forward, the disk H, through the link J, forces the clutch-block I against the rings C D and clamps the sprocket-wheel and hollow disk to the crank-shaft, whereby the bicycle is driven forward by the forward pedaling of the rider. When it is desired to coast, the pedals are held stationary, and this relieves the clamping pressure upon the block I, leaving the sprocket-wheel free to turn on the hollow disk.

The brake mechanism comprises a brake-shoe K, which is applied to an inward projection of the ring D, which is provided with a braking-surface $d$ to receive the brake-shoe. As illustrated, this brake-surface is of V shape in order to prevent lateral movement of the brake-shoe. The brake-shoe is connected by an arm L to a pivotal bolt M, fastened to the bicycle-frame, a spring N being provided to hold the brake-shoe away from the brake-surface $d$. An arm O projects forward from the brake-shoe, as shown more particularly in Fig. 3, and is adapted to be engaged by a pin P, projecting from the disk-plate F.

The operation of the brake mechanism is as follows: When the pedals and sprocket-wheel are driven forward, the pin P will click past the arm O, raising the brake-shoe slightly. When it is desired to put on the brake, the pedals are turned backward, the hollow disk by reason of the engagement of clutch-block I with the shoulders at each side of the cut-away portion in ring G then being locked to the crank-shaft and turning therewith until the pin P comes in contact with the upper side of the arm O, after which continued back pressure on the pedals will exert more or less braking pressure upon the brake-shoe, according to the pleasure of the rider. While I have shown but one pin P, I may use more than one; but it would be preferable to use not more than two, as it is desirable that the pin or pins P should be so located as to bring pressure to bear upon the arm O when the crank-arms are in a horizontal position, such locations being indicated by broken lines to represent the pin P in Fig. 1.

While I have described the rings C and D as forming a V-groove in which the hollow disk runs, I do not confine myself to this form of groove, since it will be apparent that any form of groove, or channel provided on the inner peripheries of the rings C and D to prevent lateral motion of the sprocket-wheel and hollow disk relatively to one another will come within the scope of my invention. Also any desirable form or contour may be given to the braking-surface $d$ on the ring D. Furthermore, I do not confine myself to the particular device shown for operating the clutch-block I.

Having thus described my improvements, what I claim as my invention, and desire to secure by Letters Patent, is—

1. The combination, with the driving-shaft of a bicycle or other vehicle, of a hollow disk loosely mounted on the shaft, said disk comprising two side plates united to a peripheral ring, a sprocket-wheel revoluble upon said disk, a clutch-block radially adjustable in an opening through said peripheral ring, and mechanism within the disk operated by the shaft, when rotated forward, to throw said block into engagement with the sprocket-wheel.

2. The combination, with the driving-shaft of a bicycle or other vehicle, of a hollow disk loosely mounted on the shaft, said disk comprising two side plates united to a peripheral ring, a sprocket-wheel revoluble upon said disk, a clutch-block radially adjustable in an opening through said peripheral ring, a disk attached to the shaft between said side plates, and a link connecting said disk and clutch-block whereby said clutch-block is thrown into engagement with the sprocket-wheel when the shaft is rotated forward.

3. The combination, with the driving-shaft of a bicycle or other vehicle, of a disk mounted on and rotating with the shaft, a sprocket-wheel revoluble upon said disk, mechanism for operatively connecting said parts during forward rotation only, a braking-surface projecting laterally from the sprocket-wheel, a brake-shoe pivoted to the rear frame-brace of the bicycle in position to engage said braking-surface, an arm projecting forward from said shoe, and a lateral projection on the disk to positively engage said arm and set the brake when the shaft is turned backward.

In testimony whereof I have affixed my signature in presence of two witnesses.

JAMES FRANKLIN WILBUR.

Witnesses:
THADDEUS R. CLARK,
J. GROVE BROWN.